United States Patent Office 3,408,353
Patented Oct. 29, 1968

3,408,353
1,3,4,9b-TETRAHYDRO-2H-INDENO(1,2-c)PYRIDINE DERIVATIVES
Ernst Jucker, Ettingen, and Anton Ebnöther, Reinach, Basel-Land, Switzerland, assignors to Sandoz Ltd., Basel, Switzerland
No Drawing. Filed Jan. 12, 1965, Ser. No. 425,049
Claims priority, application Switzerland, Jan. 17, 1964, 492/64; Sept. 18, 1964, 12,187/64; Oct. 20, 1964, 13,571/64; Oct. 26, 1964, 13,572/64
16 Claims. (Cl. 260—293)

ABSTRACT OF THE DISCLOSURE 1,3,4,9b - tetrahydro - 2H - indeno(1,2-c)pyridine derivatives of the formula

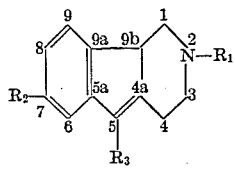

wherein
$R_1$ is hydrogen, lower alkyl, lower hydroxyalkyl or benzyl,
$R_2$ is hydrogen, halogen or lower alkyl and
$R_3$ is phenyl which may be substituted by halogen, lower alkyl, methoxy or methylthio, or benzyl, pyridyl, pyridyl-methyl, thienyl, and their acid addition salt possess sedative and neuroleptic properties. Processes for producing these pyridine derivatives are disclosed.

The present invention relates to new heterocyclic compounds and a process for their production.
The present invention provides 1,3,4,9b-tetrahydro-2H-indeno[1,2-c]pyridine derivatives of Formula I,

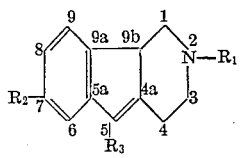

in which
$R_1$ signifies a hydrogen atom, a lower alkyl, lower hydroxyalkyl or the benzyl radical,
$R_2$ signifies a hydrogen or halogen atom or a lower alkyl radical, and
$R_3$ signifies a phenyl radical which may be substituted by halogen, lower alkyl, methoxy or methylthio, the benzyl, pyridyl, pyridyl-methyl or thienyl radical, and their acid addition salts. As used herein, the term "lower" designates alkyl and hydroxyalkyl radicals of from 1 to 4 and 2 to 4 carbon atoms inclusive respectively.
The present invention further provides a process for the production of compounds of Formula Ia,

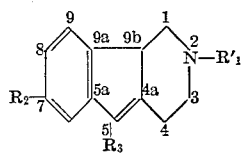

in which
$R'_1$ is a lower alkyl or benzyl radical, and
$R_2$ and $R_3$ are as defined above, and their acid addition salts, characterized in that the elements of water are split off from a 1,2,3,4,4a,9b-hexahydro - 5H - indeno[1,2-c]pyridin - (5) - ol derivative of Formula IV,

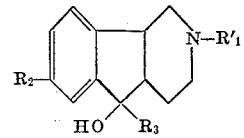

in which
$R'_1$, $R_2$ and $R_3$ have the above significance,
and, when an acid addition salt is required, the resulting compound of Formula Ia is reacted with an organic or inorganic acid.
The compounds of Formula IV may be obtained by reacting a 1,2,3,4,4a,9b-hexahydro-5H-indeno[1,2-c]pyridin-(5)-one of Formula II,

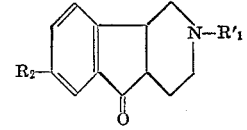

in which
$R'_1$ and $R_2$ have the above significance,
with an organo metal compound of Formula III,

$$Me—R_2 \qquad III$$

in which
$R_3$ has the above significance, and
Me signifies a lithium atom or a halogen magnesium radical,
and hydrolysing the resulting product to give the compound of Formula IV.
The present invention also provides a process for the production of compounds of Formula Ib,

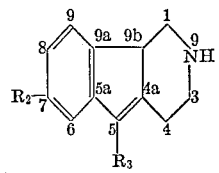

in which
$R_2$ and $R_3$ have the meaning stated above,
characterized in that a compound of Formula IVa,

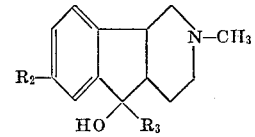

in which
$R_2$ and $R_3$ have the above meaning,
is treated with a chloroformic acid alkyl ester, the alkoxy carbonyl radical is split off hydrolytically from the resulting 2-alkoxycarbonyl derivative, and the elements of water are split off from the resulting secondary amino compound of Formula V,

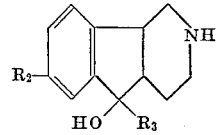

in which
$R_2$ and $R_3$ have the above significance, and, when an acid addition salt is required, the resulting compound Ib is reacted with an organic or inorganic acid.

The present invention further provides a process for the production of compounds of Formula Ic,

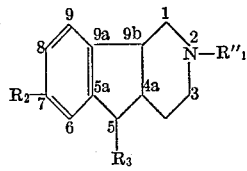

in which
R″₁ is a lower hydroxyalkyl or benzyl radical and
R₂ and R₃ have the above significance,
characterized in that the secondary amino compound of Formula V defined above is reacted with a hydroxyalkylating agent or a benzyl halide, and the elements of water are split off from the resulting compound to give the required compound of Formula Ic, and, when an acid addition salt is required, reaction with an organic or inorganic acid is effected.

The compounds of Formulae II, IV and V and their acid addition salts are new and also form part of the present invention.

One method of producing compounds of Formula Ia above consists in that a solution of a compound of Formula II in an anhydrous organic solvent is added dropwise to a solution of a compound of Formula III in more of the same or another anhydrous solvent and the reaction mixture is then stirred for approximately one hour at 0–20° C. or heated to the boil for some time to complete the reaction. After hydrolysing with aqueous ammonium chloride solution in the cold, the reaction mixture is extracted with an organic solvent and isolated and purified in the usual manner. By splitting off the elements of water, e.g. by heating with a mineral acid (e.g. concentrated hydrochloric acid) or with a strong organic acid, acetic anhydride, thionyl chloride or phosphorus oxychloride, the required compound Ia is obtained.

Compounds Ib may be obtained from a compound of Formula IVa, for example, by reacting 2-methyl-5-phenyl - 1,2,3,4,4a,9b - hexahydro - 5H - indeno[1,2-c]-pyridin-(5)-ol in an inert organic solvent, e.g. benzene or toluene, with a chloroformic acid alkyl ester while heating and the alkoxycarbonyl radical is split off from the isolated 2-alkoxycarbonyl compound, which may optionally be purified previously by crystallization, by heating in an alcoholic solution of a base, preferably with potassium hydroxide in n-butanol. The resulting secondary amino compound of Formula V is subjected to the splitting off of the elements of water as described above to give the required compound of Formula Ib. Alternatively, the compound of Formula V may be reacted with an alkylene oxide, e.g. ethylene oxide or propylene oxide, or heated with chloro-propanol or a benzyl halide in the presence of an alkali metal carbonate, a tertiary amine or a second mol of the compound of Formula V, e.g., in absolute ethanol; the elements of water may be split off from the resulting 2-(hydroxyalkyl)- or 2-benzyl-1,2,3,4,4a,9b - hexahydro - 5H - indeno[1,2-c]pyridin-(5) - ol derivative by heating with a strong acid, preferably with methanolic hydrochloric acid, whereby a compound of Formula Ic results.

Compounds of Formula I are basic substances; with organic or inorganic acids they form relatively stable salts which are crystalline at room temperature. Examples of inorganic acids for acid addition salt formation are hydrochloric, hydrobromic and sulphuric acid; those of organic acids are malonic, fumaric, maleic, tartaric, malic, naphthalene - 1,5 - disulphonic, cyclohexanecarboxylic, benzenesulphonic and p-toluenesulphonic acid.

Compounds of Formula I have valuable pharmacodynamic properties and are thus indicated for use as medicaments. They are distinguished by sedative and neuroleptic properties, e.g. a narcosis potentiating action, inhibition of conditional and emotional reactions and motor activity, while having a low toxicity. These properties are especially marked in the case of 2-methyl-5-phenyl - 1,3,4,9b - tetrahydro - 2H - indeno[1,2-c]-pyridine, and also—though to a lesser extent—in the case of the other exemplified compounds. The compounds of Formula I also have adrenolytic properties. They are especially for administration in the form of their water-soluble, physiologically acceptable salts.

The compounds of Formula I are indicated for use as pharmaceuticals on their own or in the form of appropriate medicinal preparations for administration, e.g., enterally or parenterally. In order to produce appropriate medicinal preparations the compounds of Formula I are worked up with inorganic or organic adjuvants which are inert and physiologically acceptable. Examples of such adjuvants are:

tablets and dragees: lactose, starch, talc and stearic acid;
injectable solutions: water, alcohols, glycerin and vegetable oils.

The preparations may furthermore contain suitable preserving, stabilizing and wetting agents, solubilizers, sweetening and colouring substances and flavourings.

The present invention therefore also provides pharmaceutical compositions containing, in addition to a physiologically acceptable carrier, a compound of Formula I and/or an acid addition salt thereof which is physiologically acceptable.

The compounds of Formula II are new and may be produced as follows: A 1-alkyl- or 1-benzyl-Δ₃-isonipecotic acid alkyl ester of Formula VI,

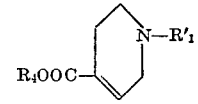

in which
R′₁ has the above significance and
R₄ signifies a lower alkyl radical,
is reacted with a Grignard compound of Formula VII,

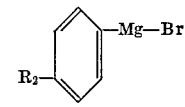

in which
R₂ has the above significance,
the reaction product is hydrolysed and the resulting isonipecotic acid alkyl ester derivatives of Formula VIII

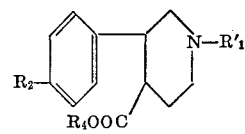

in which
R′₁, R₂ and R₄ have the above significance,
is cyclized to give a compound of Formula II either via the free acid and the acid chloride with aluminum chloride, or directly with polyphosphoric acid.

In the following non-limitative examples all temperatures are indicated in degrees centigrade and are uncorrected.

Example 1.—2-methyl-5-phenyl-1,3,4,9b-tetrahydro-2H-indeno[1,2-c]pyridine (a) 2-methyl-5-phenyl-1,2,3,4,4a,9b-hexahydro - 5H - indeno[1,2-c]pyridin-(5)-ol.

A solution of 5.04 g. of 2-methyl-1,2,3,4,4a,9b-hexahydro-5H-indeno[1,2-c]pyridin-(5)-one in 40 cc. of absolute tetrahydrofuran is added dropwise at room temperature to a solution of phenyl-magnesium bromide produced from 1.46 g. of magnesium shavings and 9.4 g. of bromobenzene in 25 cc. of absolute ether. Boiling is then effected for 2 hours at reflux temperature, the reaction mixture is cooled and then poured into 100 cc. of a 10% ammonium chloride solution. The mixture is shaken out with methylene chloride, dried over magnesium sulphate, the solution is evaporated and the residue crystallized from ethanol. Melting point 190–191°.

(b) 2-methyl-5-phenyl-1,3,4,9b-tetrahydro - 2H - indeno [1,2-c]pyridine 4.6 g. of the compound obtained in (a) above are boiled at reflux for one hour together with a mixture of 40 cc. of concentrated hydrochloric acid and 20 cc. of water. The mixture is then evaporated in a vacuum and the residue recrystallized from ethanol. The hydrochloride has a melting point of 211–212° (decomposition). The base produced from the hydrochloride melts at 113–114° after crystallization from isopropanol.

The 2-methyl-1,2,3,4,4a,9b-hexahydro-5H-indeno[1,2-c]pyridin-(5)-one used as starting material is produced as follows:

A solution of 69.5 g. of 1-methyl-Δ₃-iso-nipecotinic acid methyl ester in 150 cc. of ether is added dropwise whilst stirring at −15 to −10° to a solution of phenyl-magnesium bromide produced from 21.8 g. of magnesium shavings, 140 g. of bromobenzene and 500 cc. of ether. Stirring is then effected for a further 30 minutes at −10°, the mixture is poured into 1 litre of a 20% ammonium chloride solution, the ether layer is separated and shaken out with 1 litre of cold 5% hydrochloride acid. The aqueous extract is made alkaline with potassium carbonate whilst cooling well and is then extracted once more with ether. After drying over magnesium sulphate the ether is distilled off and the residue distilled in a high vacuum. 1-methyl-3-phenyl-isonipecotinic acid methyl ester (a stereoisomer mixture) distils at 135–136°/0.5 mm. Hg. $n_D^{22}$=1.5235.

60 g. of this compound are heated with 325 cc. of 20% hydrochloric acid for 2 hours, whereby 125 cc. are slowly distilled off. Evaporation is then effected in a vacuum and the residue is dried well. The residue is then covered with 150 cc. of thionyl chloride and the solution is stirred for 2 hours at room temperature. Excess thionyl chloride is then distilled off in a vacuum, the residue is dissolved in 350 cc. of tetrachloroethane and 100 cc. are distilled off in a vacuum, in order to remove thionyl chloride completely, 67 g. of aluminum chloride are then added at 40° and stirring is effected for one hour. The reaction mixture is then poured into 1 litre of an approximately 1 N hydrochloric acid solution. The resulting solution is shaken out twice with ether which is discarded, then made alkaline with a 50% potassium hydroxide solution and subsequently extracted three times with ether. After drying over magnesium sulphate and evaporating the ether, the crystalline residue is recrystallized from hexane. 2-methyl-1,2,3,4,4a,9b-hexahydro-5H-indeno[1,2-c]pyridin-(5)-one has a melting point of 94–96°.

Example 2.—2-methyl-5-benzyl-1,3,4,9b-tetrahydro-2H-indeno[1,2-c]pyridine

A solution of 12.08 g. of 2-methyl-1,2,3,4,4a,9b-hexahydro-5H-indeno[1,2-c]pyridin-(5)-one in 150 cc. of anisole is added to a solution of benzyl-magnesium chloride produced from 7.3 g. of magnesium shavings, 38 g. of benzyl chloride and 150 cc. of ether. The ether is then distilled off, boiling is subsequently effected at reflux for 16 hours, the reaction mixture is cooled, poured into 500 cc. of a 10% ammonium chloride solution and extracted with ether. The ether solution is extracted three times, each time with 50 cc. of 2 N hydrochloric acid. 100 cc. of concentrated hydrochloric acid are added to this extract and boiling at reflux is effected for one hour. Cooling is then effected, the precipitated hydrochloride is filtered off, dried and recrystallized from methanol. 2-methyl-5-benzyl-1,3,4,9b - tetrahydro-2H-indeno[1,2c]pyridine hydrochloride melts at 238° (decomposition). The citrate melts at 135–137° (decomposition). The free base may be obtained in the usual manner.

Example 3.—2-methyl-5-[pyridyl-(2)-methyl]-1,3,4,9b-tetrahydro-2H-indeno[1,2-c]pyridine (a) 2 - methyl - 5 - [pyridyl - (2) - methyl]-1,2,3,4,4a,9b-hexahydro-5H-indeno[1,2-c]pyridin-(5)-ol.

9.5 g. of 2-methyl-pyridine are added dropwise at room temperature to a solution of phenyllithium produced from 1.4 g. of lithium, 15.7 g. of bromobenzene and 75 cc. of ether. Heating at reflux is then effected for 30 minutes, whereupon cooling is effected and a solution of 10.06 g. of 2 - methyl - 1,2,3,4,4a,9b - hexahydro-5H-indeno[1,2-c]pyridin-(5)-one in 40 cc. of absolute tetrahydrofuran is added dropwise. Boiling at reflux is then effected for a further hour, cooling is effected once more and the mixture is poured into 250 cc. of 2 N hydrochloric acid. The solution is shaken out with ether which is discarded, is then made alkaline with sodium hydroxide solution and extracted with methylene chloride. After drying over potassium carbonate and evaporating the solvent the residue is chromatographed on 750 g. of aluminium oxide (according to Brockmann), whereby elution is effected with methylene chloride. The first 600 cc. still contain starting material, the following 3.5 litres contain oily 2-methyl - 5 - [pyridyl - (2) - methyl]-1,2,3,4,4a,9b-hexahydro-5H-indeno[1,2-c]pyridin-(5)-ol. 9.6 g. of this oil are dissolved in 25 cc. of methanol. 9.3 g. of naphthalene-1,5-disulphonic acid are then added and are dissolved completely by heating. Upon cooling the acid naphthalene-1,5-disulphonate crystallizes immediately; after recrystallization from water it melts at 245–250° (decomposition).

(b) 2 - methyl - 5 - [pyridyl - (2) - methyl] - 1,3,4,9b-tetrahydro-2H-indeno[1,2-c]pyridine.

15 g. of the salt obtained according to Example 3(a) are boiled at reflux for one hour together with 150 cc. of 20% hydrochloric acid. Cooling is then effected, the mixture is made alkaline with a 40% sodium hydroxide solution, the difficulty soluble naphthalene-1,5-disulphonic acid sodium is filtered off and shaken out with methylene chloride. After drying over sodium sulphate and evaporating the solvent the oily base is dissolved in 10 cc. of ethanol and the calculated amount of hydrochloric acid to form the mono-hydrochloride is added thereto (for example 6.7 g. of base; 12.1 cc. of 2 N hydrochloric acid). Evaporation to dryness is then effected in a vacuum and the residue is recrystallized from ethanol. 2-methyl-5-[pyridyl-(2)-methyl] - 1,3,4,9b - tetrahydro - 2H - indeno [1,2-c]pyridine hydrochloride has a melting point of 205° (decomposition).

The acid fumarate melts at 181–182° (decomposition) after crystallization from ethanol.

Example 4.—2-methyl-5-p-chlorophenyl-1,3,4,9b-tetrahydro-2H-indeno[1,2-c]pyridine (a) 2 - methyl - 5 - p - chlorophenyl - 1,2,3,4,4a,9b-hexahydro-5H-indeno[1,2-c]pyridin-(5)-ol.

A granule of iodine and 5 cc. of a solution of 65 g. of p-chloro-bromobenzene in 100 cc. of absolute tetrahydrofuran are added to a suspension of 8.02 g. of magnesium in 25 cc. of absolute tetrahydrofuran. Heating is effected until the reaction commences, the heating bath is removed and the remainder of the solution is added dropwise at such a rate that the reaction solution boils continuously. Heating is then effected at reflux until all the magnesium is dissolved (approximately one hour), cooling is effected to room temperature, 50 cc. of methylene chloride are added and cooling is then effected to −50°. A solution of 20.1 g. of 2-methyl-1,2,3,4,4a,9b-hexahydro-5H-indeno[1,2-c]pyridin-(5)-one in 50 cc. of methylene chloride is added dropwise at the same temperature whilst stirring well and stirring is subsequently effected for a further hour at 0–20°. The reaction mixture is then poured into a solution of 80 g. of ammonium chloride in 300 cc. of water and 200 g. of ice. After extracting three times with methylene chloride the combined extracts are dried over potassium carbonate and the solvent is evaporated. The residue is recrystallized from acetone. Melting point 162–164°.

(b) 2 - methyl - 5 - p - chlorophenyl - 1,3,4,9b - tetrahydro-2H-indeno[1,2-c]pyridine.

5 g. of the compound obtained in (a) above are heated for one hour at reflux together with 25 cc. of 2.5 N methanolic hydrochloric acid solution. Evaporation is effected in a vacuum and the residue is recrystallized twice from ethanol. The hydrochloride melts at 224–230° (decomposition). The base produced from the hydrochloride melts at 106–107° after crystallization from hexane.

Example 5.—2-methyl-5-m-chlorophenyl-1,3,4,9b-tetrahydro-2H-indeno[1,2-c]pyridine (a) 2 - methyl - 5 - m - chlorophenyl - 1,2,3,4,4a,9b-hexahydro-5H-indeno[1,2-c]pyridin-(5)-ol.

This compound is produced in a manner analogous to the compound of Example 4(a); m-chlorobromobenzene is used in place of p-chlorobromobenzene. Melting point 185–187° from ethanol.

(b) 2 - methyl - 5 - m - chlorophenyl - 1,3,4,9b - tetrahydro-2H-indeno[1,2-c]pyridine.

5 g. of the compound obtained in (a) above are heated at reflux for one hour together with 25 cc. of 2.5 N methanolic hydrochloric acid. After evaporating in a vacuum the residue is dissolved in water, the solution is made alkaline with sodium hydroxide solution and shaken out with methylene chloride. After drying the extract over potassium carbonate and evaporating the solvent the residue is distilled in a high vacuum. The viscous oil which distils over at 0.05 mm. Hg and a bath temperature of 150–200° is dissolved in ethanol and the calculated amount of maleic acid is added thereto. The acid maleate crystallizes upon cooling; after recrystallization from ethanol the maleate melts at 147–148°.

Example 6.—2-methyl-5-o-tolyl-1,3,4,9b-tetrahydro-2H-indeno[1,2-c]pyridine (a) 2-methyl-5-o-tolyl-1,2,3,4,4a,9b-hexahydro-5H-indeno[1,2-c]pyridin-(5)-ol.

This compound is produced in a manner analogous to that described in Example 4(a), whereby o-bromotoluene is used. Melting point 171–172° from ethyl acetate.

(b) 2-methyl-5-o-tolyl-1,3,4,9b-tetrahydro-2H-indeno[1,2-c]pyridine.

This compound is produced in a manner analogous that described in Example 4(b). The hydrochloride melts at 233–237° (decomposition) from ethanol.

Example 7.—2-methyl-5-p-methoxy-phenyl-1,3,4,9b-tetrahydro-2H-indeno[1,2-c]pyridine (a) 2-methyl-5-p-methoxy-phenyl-1,2,3,4,4a,9b-hexahydro-5H-indeno[1,2-c]pyridin-(5)-ol.

This compound is produced in a manner analogous to that described in Example 4(a), wherby p-bromoanisole is used. Melting point 172–174° from ethyl acetate.

(b) 2-methyl-5-p-methoxy-phenyl-1,3,4,9b-tetrahydro-2H-indeno[1,2-c]pyridine.

This compound is produced in a manner analogous to that described in Example 4(b). The hydrochloride melts at 198–294° (decomposition) from isopropanol/water (9:1).

Example 8.—2-methyl-5-p-methylthio-phenyl-1,3,4,9b-tetrahydro-2H-indeno[1,2-c]pyridine (a) 2-methyl-5-p-methylthio-phenyl-1,2,3,4,4a,9b-hexahydro-5H-indeno[1,2-c]pyridin-(5)-ol.

This compound is produced in a manner analogous to that described in Example 4(a), whereby p-bromothioanisole is used. Melting 174–176° from ethyl actate.

(b) 2-methyl-5-p-methylthio-phenyl-1,3,4,9b-tetrahydro-2H-indeno[1,2-c]pyridine.

This compound is produced in a manner analogous to that described in Example 4(b). The hydrochloride melts at 189–191° (decomposition) from isopropanol.

Example 9.—2-methyl-5-pyridyl-(2)-1,3,4,9b-tetrahydro-2H-indeno[1,2-c]pyridine (a) 2-methyl-5-pyridyl-(2)-1,2,3,4,4a,9b-hexahydro-5H-indeno[1,2-c]pyridin-(5)-ol.

A solution of 8.9 g. of n-butylbromide in 20 cc. of ether is added dropwise in an atmosphere of nitrogen to a suspension of 0.98 g. of finely shredded lithium wire in 50 cc. of absolute ether whilst stirring well at −10° and stirring is effected until the lithium is dissolved. After cooling to −50° a solution of 8.7 g. of 2-bromopyridine in 10 cc. of ether is added dropwise during the course of 15 minutes and subsequently a solution of 10.1 g. of 2 - methyl - 1,2,3,4,4a,9b - hexahydro - 5H - indeno [1,2-c]pyridin-(5)-one in 40 cc. of absolute tetrahydrofuran is added dropwise. After stirring for two hours at −40° the temperature is allowed to rise to 20°, the reaction mixture is poured into 200 cc. of a 10% ammonium chloride solution and the mixture is shaken out a number of times with ether. After drying the combined extracts over magnesium sulphate and evaporating the solvent the residue is first recrystallized from acetone and then twice from hexane. Melting point 119–120°.

(b) 2-methyl-5-pyridyl-(2)-1,3,4,9b-tetrahydro-2H-indeno[1,2-c]pyridine.

2.9 g. of the compound obtained in (a) above are heated to 120° for one hour together with 15 g. of benzenesulphonic acid. 50 cc. of water are then added to the reaction mixture, the undissolved flakes are filtered off, the solution is made alkaline with a 40% sodium hydroxide solution and shaking is effected a number of times with methylene chloride. After drying the combined extracts over magnesium sulphate and evaporating the solvent the residue is distilled in a high vacuum. The viscous oil which distills over at 0.02 mm. Hg and a bath temperature of 135–160° is dissolved in acetone and the calculated amount of maleic acid for the formation of the acid maleate is added thereto. The maleate crystallizes upon cooling. It is first recrystallized from acetone and then from ethanol and crystallizes with ½ mol of water of crystallization. The maleate hemi-hydrate melts at 135–137° (decomposition); sintering above 133°.

Example 10.—2-methyl-5-thienyl-1,3,4,9b-tetrahydro-2H-indeno[1,2-c]pyridine (a) 2-methyl-5-thienyl-1,2,3,4,4a,9b-hexahydro-5H-indeno[1,2-c]pyridin-(5)-ol.

This compound is produced in a manner analogous to that described in Example 4(a), whereby α-bromothiophene is used. Melting point 188–190° from ethyl acetate.

(b) 2-methyl-5-thienyl-1,3,4,9b-tetrahydro-2H-indeno[1,2-c]pyridine.

5 g. of the compound obtained in (a) above in 30 cc. of isopropanol are heated at reflux with 4 g. of benzenesulphonic acid for one hour. After cooling the crystallized benzene sulphonate is filtered off and recrystallized from ethanol. The benzene sulphonate melts at 158–160°. The base produced from the benzene sulphonate melts at 72–73° after crystallization from pentane.

(a) 2-ethoxycarbonyl-5-phenyl-1,2,3,4,4a,9b-hexahydro-5H-indeno[1,2-c]pyridin-(5)-ol.

Example 11.—2-(2-hydroxyethyl)-5-phenyl-1,3,4,9b-tetrahydro-2H-indeno[1,2-c]pyridine A solution of 26 g. of chloroformic acid ethyl ester in 100 cc. of benzene is added dropwise is a hot solution of 21.6 g. of 2 - methyl - 5 - phenyl - 1,2,3,4,4a,9b-hexahydro - 5H - indeno[1,2-c]pyridin - (5) - ol (produced in accordance with Example 1) in 400 cc. of benzene and the reaction mixture is heated at reflux for 2½ hours. After cooling some of the precipitated hydrochloride is filtered off and the filtrate is evaporated at 15 mm. Hg. The residue is recrystallized from acetone. Melting point 148–149°.

(b) 5-phenyl-1,2,3,4a,9b-hexahydro-5H-indeno[1,2-c]pyridin-(5)-ol.

21.3 g. of the compound obtained in (a) above are heated at reflux with 210 cc. of n-butanol and 17.7 g. of potassium hydroxide for 9 hours in an atmosphere of nitrogen. After standing over night at room temperature the crystalline compound is filtered off, washed well with water, dried and recrystallized from ethanol. Melting point 190–191°. A further portion of the compound may be obtained from the butanol mother liquor.

(c) 2-(2-hydroxyethyl)-5-phenyl-1,3,4,9b-tetrahydro-2H-indeno[1,2-c]pyridine.

20 cc. of a 6.7% absolute ethanolic ethylene oxide solution are added to a solution of 5.3 g. of the compound obtained in (b) above in 100 cc. of absolute ethanol and heating is effected to 85° in an autoclave for 3 hours. The reaction mixture is subsequently evaporated at 15 mm. Hg and the residue together with 2.5 N methanolic hydrochloric acid is heated at reflux for one hour. After evaporating the solvent the residue is dissolved in acetone, whereby the hydrochloride crystallizes. It is recrystallized twice from ethanol. Very fine, felted needles, melting at approximately 175–182° (decomposition). The neutral naphthalene - 1,5 - disulphonate melts at 227–228° after crystallization from methanol.

Example 12.—5-phenyl-1,3,4,9b-tetrahydro-2H-indeno[1,2-c]pyridine 5 g. of 5 - phenyl - 1,2,3,4,4a,9b - hexahydro-5H-indeno[1,2-c]pyridin - (5) - ol [produced in accordance with Example 11(b)] are heated at reflux with 50 cc. of 2.5 N methanolic hydrochloric acid for 15 minutes. After cooling the reaction mixture the precipitate is filtered off and recrystallized twice from 95% ethanol. The 5 - phenyl - 1,3,4,9b - tetrahydro - 2H - indeno[1,2-c]pyridine hydrochloride crystallizes with ¼ mol of water of crystallization. Melting point 175–178° (decomposition). The free base may be obtained in the usual manner.

Example 13.—7-chloro-2-methyl-5-phenyl-1,3,4,9b-tetrahydro-2H-indeno[1,2-c]pyridine (a) 7-chloro-2-methyl-5-phenyl-1,2,3,4,4a,9b-hexahydro-5H-indeno[1,2-c]pyridin-(5)-ol.

A granule of iodine and 5 cc. of a solution of 53.4 g. of bromobenzene in 50 cc. of absolute tetrahydrofuran are added to a suspension of 8.02 g. of magnesium in 25 cc. of absolute tetrahydrofuran. Heating is effected until the reaction commences, the heating bath is removed and the remainder of the solution is added dropwise at such a rate that the reaction mixture boils continuously. Heating at reflux is then effected until all the magnesium is dissolved (approximately one hour), cooling is then effected to room temperature, 50 cc. of methylene chloride are added and cooling is then effected to —50°. A solution of 23.6 g. of 7 - chloro - 2 - methyl-1,2,3,4,4a,9b-hexahydro - 5H - indeno[1,2-c]pyridin - (5) - one in 50 cc. of methylene chloride is added dropwise whilst stirring well at the same temperature and stirring is then effected for a further hour at 0–20°. The reaction mixture is then poured into a solution of 80 g. of ammonium chloride in 300 cc. of water and 200 g. of ice. After extracting thrice with methylene chloride the combined extracts are dried over potassium carbonate and the solvent is evaporated. The residue is recrystallized from methanol. Melting point 210–214° (decomposition).

(b) 7-chloro-2-methyl-5-phenyl - 1,3,4,9b - tetrahydro-2H-indeno[1,2-c]pyridine.

5 g. of the compound obtained in (a) above are heated at reflux for one hour together with 25 cc. of 2.5 N methanolic hydrochloric acid. Evaporation is effected in a vacuum and the residue is recrystallized twice from isopropanol. The hydrochloride melts of 217–222° (decomposition). The base produced from the hydrochloride melts at 120–123° after crystallization from ethyl acetate.

The 7-chloro-2-methyl - 1,2,3,4,4a,9b - hexahydro-5H-indeno[1,2-c]pyridin-(5)-one used as starting material is produced as follows:

1-methyl-3-p-chlorophenyl-isonipecotic acid methyl ester (stereoisomer mixture)

A granule of iodine and 25 cc. of a solution of 421 g. of p-chloro-bromobenzene in 600 cc. of toluene and 200 cc. of tetrahydrofuran are added to a suspension of 51 g. of magnesium in 200 cc. of absolute tetrahydrofuran. Heating is effected until the reaction commences, the heating bath is then removed and the remainder of the solution is then added at such a rate that the reaction solution boils continuously (approximately one hour), whereby the temperature rises from 70° to 110°. The reaction mixture is subsequently heated at reflux for a further hour whilst stirring. After cooling the Grignard solution to —15°, a solution of 155 g. of 1-methyl-$\Delta_3$-isonipecotinic acid methyl ester in 200 cc. of absolute toluene is run dropwise under the surface of the Grignard solution whilst stirring well during the course of 2 hours, stirring is effected for a further hour at —15° and the reaction mixture is then poured into a solution of 300 g. of ammonium chloride in 1000 cc. of water and 1000 g. of ice. After adding 1000 cc. of ether and filtering through highly purified diatomaceous earth the organic phase is separated and the aqueous phase is extracted further twice more with ether. The organic extracts are then extracted with 2000 cc. of N hydrochloric acid, then thrice, each time with 1000 cc. of water, the aqueous extracts are made alkaline with sodium hydroxide solution whilst cooling well and extracted thrice with a total of 2500 cc. of methylene chloride. After drying the combined extracts over magnesium sulphate and evaporating the solvent the residue is distilled. The fraction which distils over at a pressure of 0.1 mm. Hg at 135–150° is then distilled once more in a Vigreux flask. The stereoisomer mixture distils over at 118–125°/0.02 mm. Hg in the form of a light yellow coloured oil. $n_D^{25}$=1.5329.

7-chloro-2-methyl - 1,2,3,4,4a,9b - hexahydro-5H-indeno [1,2-c]pyridin-(5)-one.

40 g. of the methyl ester obtained above are heated to 180° for 4 hours together with 400 g. of polyphosphoric acid. The reaction mixture is subsequently poured into 1000 cc. of water and the pH value of the solution is adjusted to 8 with a 40% caustic potash solution whilst adding ice. The reaction mixture is then extracted thrice with ether, the combined extracts are dried over potassium carbonate and the solvent is evaporated. The residue is then distilled in an atmosphere of nitrogen, whereby the compound distils over at 120–128°/0.02 mm. Hg in the form of a yellow oil and crystallizes in the cold. Melting point 82–84° from hexane. The compound oxidizes rapidly in solution. Hydrochloride: melting point 220–223° (decomposition) from ethanol.

11

Example 14.—2,7-dimethyl-5-phenyl-1,3,4,9b-tetrahydro-2H-indeno[1,2-c]pyridine (a) 2,7-dimethyl-5-phenyl - 1,2,3,4,4a,9b - hexahydro-5H-indeno[1,2-c]pyridin-(5)-ol.

This compound is produced in a manner analogous to that described in Example 13(a), whereby 21.5 g. of 2,7-dimethyl - 1,2,3,4,4a,9b - hexahydro - 5H - indeno[1,2-c]pyridin-(5)-one are used. Melting point 189–191° from ethyl acetate.

(b) 2,7-dimethyl - 5 - phenyl - 1,3,4,9b - tetrahydro-2H-indeno[1,2-c]pyridine.

This compound is produced in a manner analogous to that described in Example 13(b). The hydrochloride melts at 220–230° (decomposition) from ethanol.

The 2,7-dimethyl - 1,2,3,4,4a,9b - hexahydro - 5H - indeno[1,2-c]pyridin-(5)-one used as starting material is produced in a manner analogous to that of 7-chloro-2-methyl - 1,2,3,4,4a,9b - hexahydro - 5H - indeno[1,2-c]pyridin-(5)-one (see Example 13).

1-methyl - 3 - p - tolyl-isonipecotinic acid methyl ester (stereoisomer mixture)

This compound is produced from 376 g. of p-bromotoluene and 155 g. of 1-methyl - Δ3 - isonipecotinic acid methyl ester in a manner analogous to that described in Example 2. Boiling point 125–130°/0.08 mm. Hg. $n_D^{22}$=1.5215.

2,7-dimethyl - 1,2,3,4,4a,9b - hexahydro-5H-indeno[1,2-c]pyridin-(5)-one.

Produced in manner analogous to that described in Example 2. Melting point 90–91° from ethyl acetate.

Example 15.—2-benzyl-5-phenyl - 1,3,4,9b - tetrahydro-2H-indeno[1,2-c]pyridine (a) 2-benzyl - 5 - phenyl - 1,2,3,4,4a,9b - hexahydro-5H-indeno[1,2-c]pyridin-(5)-ol.

5 g. of 5-phenyl - 1,2,3,4,4a,9b - hexahydro-5H-indeno-[1,2-c]pyridin - (5) - ol [obtained according to Example 11(b)], 2.8 g. of benzyl chloride, 3 cc. of triethylamine and 100 cc. of ethanol are heated at reflux for 4 hours. The solution is then evaporated in a vacuum and the residue is stirred with dilute sodium hydroxide solution and methylene chloride. The methylene chloride extracts are washed with water, dried over sodium sulphate and evaporated. The residue is then recrystallized a number of times from isopropanol. Melting point 139–141°.

(b) 2-benzyl-5-phenyl - 1,3,4,9b - tetrahydro-2H-indeno[1,2-c]pyridine.

4.5 g. of the compound obtained in (a) above are heated at reflux for 15 minutes together with 25 cc. of a 2.5 N methanolic hydrochloric acid. The hydrochloride crystallizes upon cooling. After recrystallizing twice from ethanol it melts at 212–214° (decomposition).

12

What is claimed is:
1. Compounds of the formula

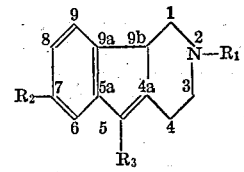

wherein
$R_1$ is a member selected from the group consisting of hydrogen, lower alkyl, lower hydroxyalkyl and benzyl,
$R_2$ is a member selected from the group consisting of hydrogen, halogen and lower alkyl,
$R_3$ is a member selected from the group consisting of benzyl, pyridyl, pyridylmethyl, thienyl, phenyl and phenyl substituted by a member selected from the group consisting of halogen, lower alkyl, methoxy and methylthio and their physiologically acceptable acid addition salts.
2. 2-methyl-5-phenyl - 1,3,4,9b - tetrahydro-2H-indeno[1,2-c]pyridine.
3. 2-methyl-5-benzyl - 1,3,4,9b - tetrahydro-2H-indeno[1,2-c]pyridine.
4. 2-methyl-5-[pyridyl - (2) - methyl]-1,3,4,9b-tetrahydro-2H-indeno[1,2-c]pyridine.
5. 2-methyl-5-p-chlorophenyl - 1,3,4,9b - tetrahydro-2H-indeno[1,2-c]pyridine.
6. 2-methyl-5-m-chlorophenyl - 1,3,4,9b - tetrahydro-2H-indeno[1,2-c]pyridine.
7. 2-methyl-5-o-tolyl - 1,3,4,9b - tetrahydro-2H-indeno[1,2-c]pyridine.
8. 2-methyl-5-p-methoxy-phenyl - 1,3,4,9b - tetrahydro-2H-indeno[1,2-c]pyridine.
9. 2-methyl-5-p-methylthio-phenyl - 1,3,4,9b - tetrahydro-2H-indeno[1,2-c]pyridine.
10. 2-methyl-5-pyridyl-(2) - 1,3,4,9b - tetrahydro-2H-indeno[1,2-c]pyridine.
11. 2-methyl - 5 - thienyl - 1,3,4,9b - tetrahydro-2H-indeno[1,2-c]pyridine.
12. 2-(2-hydroxyethyl)-5-phenyl - 1,3,4,9b - tetrahydro-2H-indeno[1,2-c]pyridine.
13. 5-phenyl - 1,3,4,9b - tetrahydro-2H-indeno[1,2-c]pyridine.
14. 7-chloro-2-methyl-5-phenyl - 1,3,4,9b - tetrahydro-2H-indeno[1,2-c]pyridine.
15. 2,7-dimethyl-5-phenyl - 1,3,4,9b - tetrahydro-2H-indeno[1,2-c]pyridine.
16. 2-benzyl - 5 - phenyl - 1,3,4,9b - tetrahydro-2H-indeno[1,2-c]pyridine.

References Cited

UNITED STATES PATENTS 2,546,652    3/1951    Plati et al. _____ 260—297

OTHER REFERENCES

Koelsch: J. Am. Chem. Soc., vol. 65, 2093–5 (1943).
Chatterjea et al.: Ber., vol. 93, 1740–5 (1960).

HENRY R. JILES, *Primary Examiner.*

A. D. SPEVACK, *Assistant Examiner.*